(12) United States Patent
Shintai et al.

(10) Patent No.: US 6,975,871 B2
(45) Date of Patent: Dec. 13, 2005

(54) MOBILE COMMUNICATIONS TERMINAL WITH POSITION DETERMINATION

(75) Inventors: Tatsuya Shintai, Chita-gun (JP); Atsushi Hayashida, Kariya (JP); Hiroyasu Ogino, Okazaki (JP)

(73) Assignee: Denso Corporation, Kariya (JP)

(*) Notice: Subject to any disclaimer, the term of this patent is extended or adjusted under 35 U.S.C. 154(b) by 462 days.

(21) Appl. No.: 10/207,097

(22) Filed: Jul. 30, 2002

(65) Prior Publication Data

US 2003/0027584 A1 Feb. 6, 2003

(30) Foreign Application Priority Data

Aug. 3, 2001 (JP) .............................. 2001-236334

(51) Int. Cl.[7] .............................................. H04Q 7/20
(52) U.S. Cl. .............................. 455/456.1; 455/456.2; 455/456.3; 701/202
(58) Field of Search ................................ 455/456, 466, 455/525, 456.2, 456.3; 701/202, 207, 208; 342/375.09; 340/573.1

(56) References Cited

U.S. PATENT DOCUMENTS

| 6,166,685 A | 12/2000 | Soliman |
| 6,381,535 B1 * | 4/2002 | Durocher et al. ........... 701/202 |
| 2001/0009406 A1 * | 7/2001 | Mise et al. ............ 342/357.09 |
| 2002/0016173 A1 * | 2/2002 | Hunzinger ................... 455/456 |
| 2004/0198395 A1 | 10/2004 | Kimoto et al. |

FOREIGN PATENT DOCUMENTS

| JP | A 11-239381 | 8/1999 |
| JP | A 2001-061178 | 3/2001 |

* cited by examiner

Primary Examiner—Sonny Trinh
Assistant Examiner—Phuoc Doan
(74) Attorney, Agent, or Firm—Oliff & Berridge, PLC (57) ABSTRACT

A control unit executes base station information collection, acquires base station information collection results, and transmits the base station information collection results to a position server via a radio communications network. A memory stores the base station information collection result. A counter counts a predetermined time. The control unit makes the counter count the predetermined time and makes the memory store the base station information collection result during a time counted by the counter when the base station information collection is started. The control unit then acquires the base station information collection results from the memory after the counter finishes the counting, and transmits the base station information collection results to a position server via the radio communications network.

12 Claims, 12 Drawing Sheets

MOBILE COMMUNICATIONS TERMINAL WITH POSITION DETERMINATION

CROSS REFERENCE TO RELATED APPLICATION

This application is based upon and claims the benefit of Japanese Patent Application No. 2001-236334 filed on Aug. 3, 2001, the contents of which are incorporated herein by reference.

FIELD OF THE INVENTION

The present invention relates to a mobile communications terminal (mobile terminal) with position determination based on communicating with a base station via radio signals, a computer program executed by the mobile terminal and a method for transmitting base station information to be used for the position determination.

BACKGROUND OF THE INVENTION

Conventionally, a position determination system meeting IS (Interim Standard) 801 is one of the position determination systems used to determine a position of a mobile terminal, e.g., a cell phone. In the system meeting IS 801, the mobile terminal starts base station information collection when the position determination is requested by a user, and then transmits the collected base station information to a position information server (position server).

The position server receives the base station information and determines an approximate position of the mobile terminal based on the base station information. The position server then transmits assist information to the mobile terminal for capturing appropriate GPS (Global Positioning System) signals of GPS satellites. The mobile terminal captures the GPS signals based on the assist information and transmits position information acquired from the GPS signals to the position server. The position server then calculates an accurate position of the mobile terminal based on the position information.

In this manner, the mobile terminal can avoid repeatedly capturing GPS signals and determining the appropriate GPS signals and therefore can reduce its calculation load. Therefore, a preparation term for starting position determination can be shortened.

Figure 10:
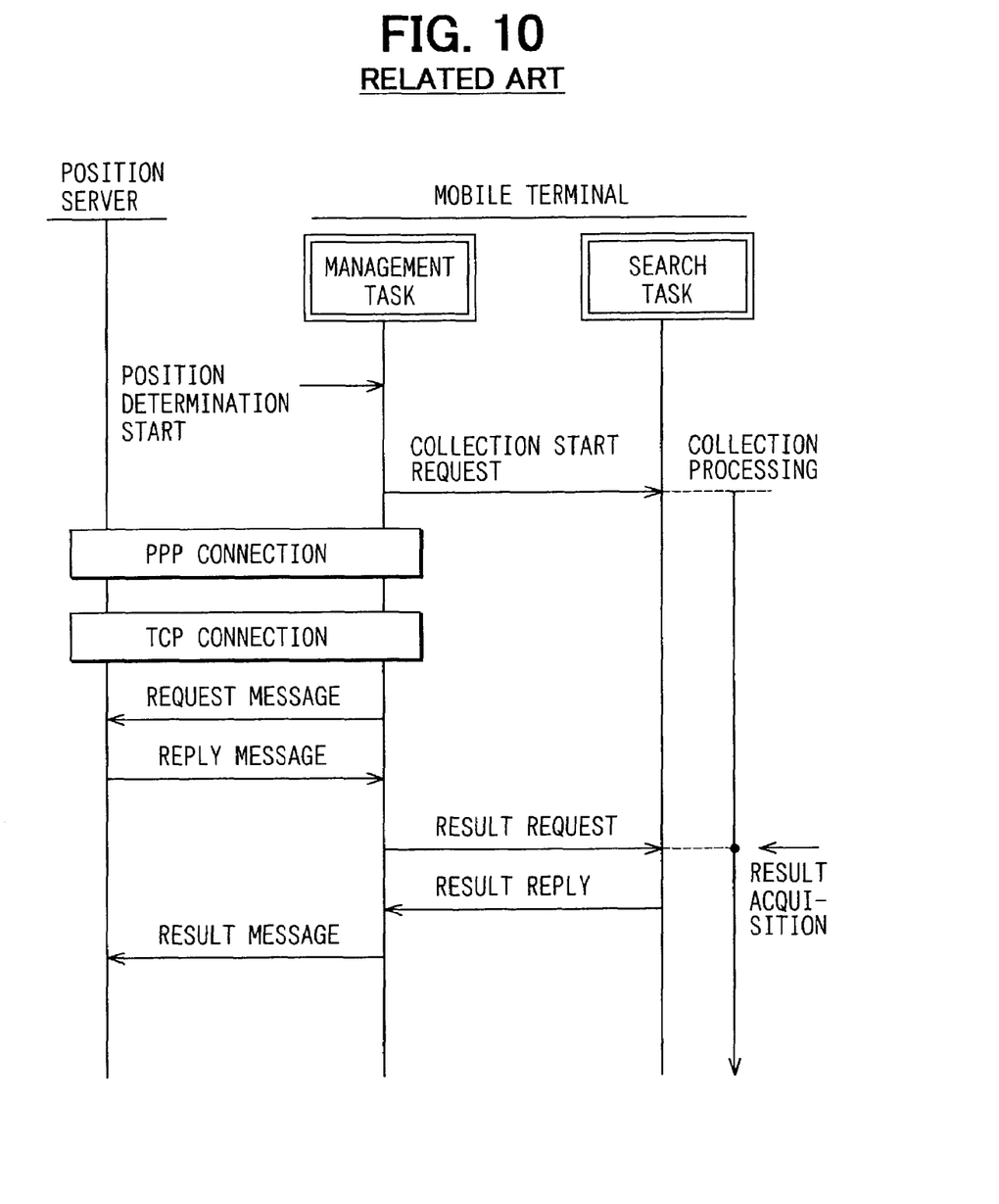
FIG. 10 is a schematic view showing a related art communications sequence.

The base station information collection is described with reference to FIGS. 10 to 12. In FIG. 10, when a position determination start instruction (signal) is transmitted by a user or the like, a PPP (Point to Point Protocol) connection and a TCP (Transmission Control Protocol) connection are still not performed between the mobile station and the position server. Upon receiving the position determination start instruction, a position determination management task transmits a base station information collection start request (signal) to a search task in the mobile terminal. The PPP connection is then executed and the TCP connection is further executed. The position determination management task transmits a base station information collection result request to the search task. Accordingly, since a term between the base station information collection start request and the base station information collection result request is long, it is enough time to collect the base station information. Therefore, accurate base station information can be transmitted to the position server.

Figure 11:
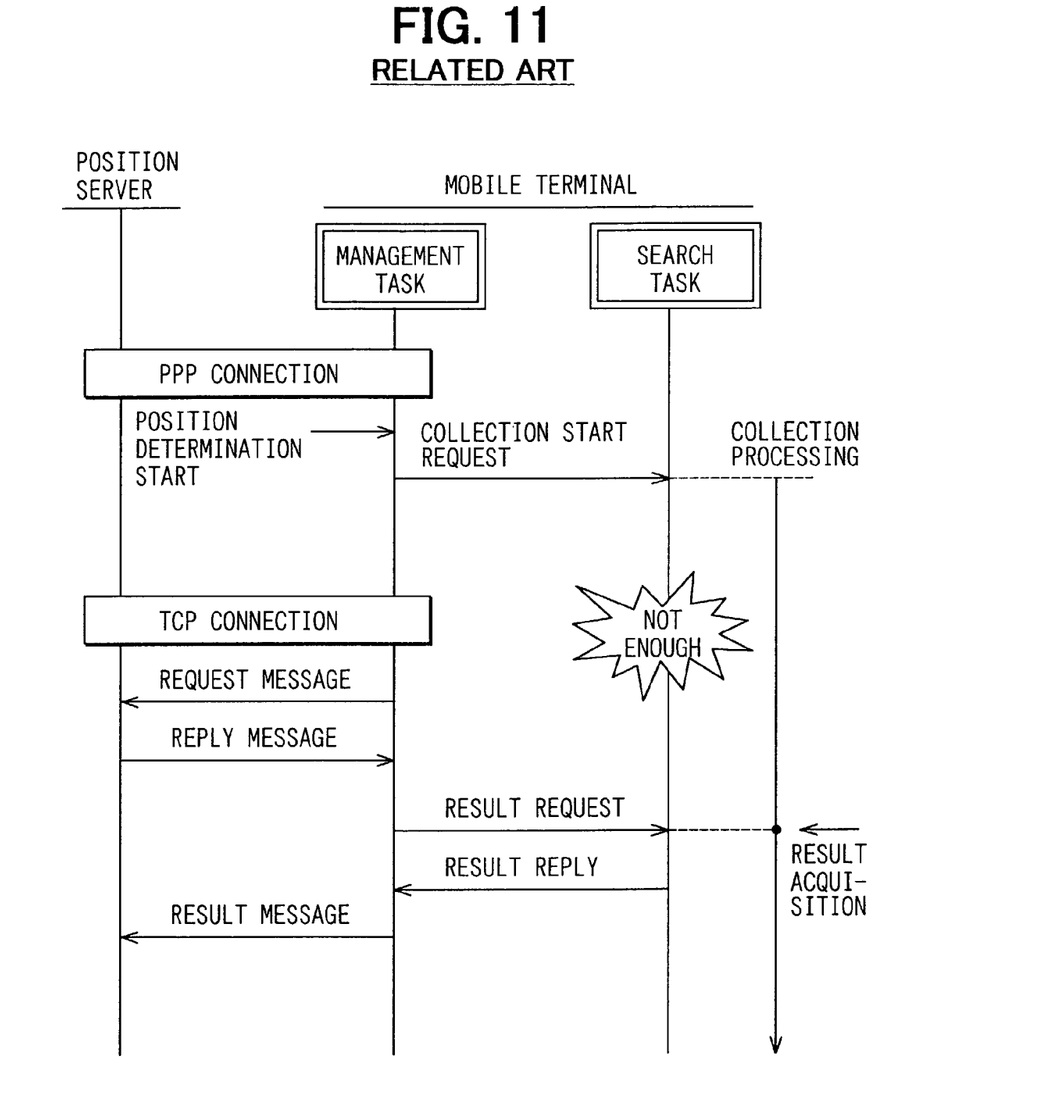
FIG. 11 is a schematic view showing a related art communications sequence when the PPP connection is performed before a position determination start instruction is transmitted.

However, as shown in FIG. 11, when the PPP connection has already been performed before the position determination start instruction is generated by a user, the TCP connection is only performed thereafter. Accordingly, since the term between the base station information collection start request and the base station information collection result request is too short, it is not enough time to collect the base station information. Therefore, accurate base station information cannot be transmitted to the position server.

In this condition, the position server calculates the approximate position of the mobile terminal based on inaccurate base station information. Therefore, the position server transmits inaccurate assist information to the mobile terminal, and the mobile terminal cannot capture appropriate GPS signals. As a result, because the position server cannot calculate an accurate position of the mobile terminal, the accuracy of the position determination decreases.

Figure 12:
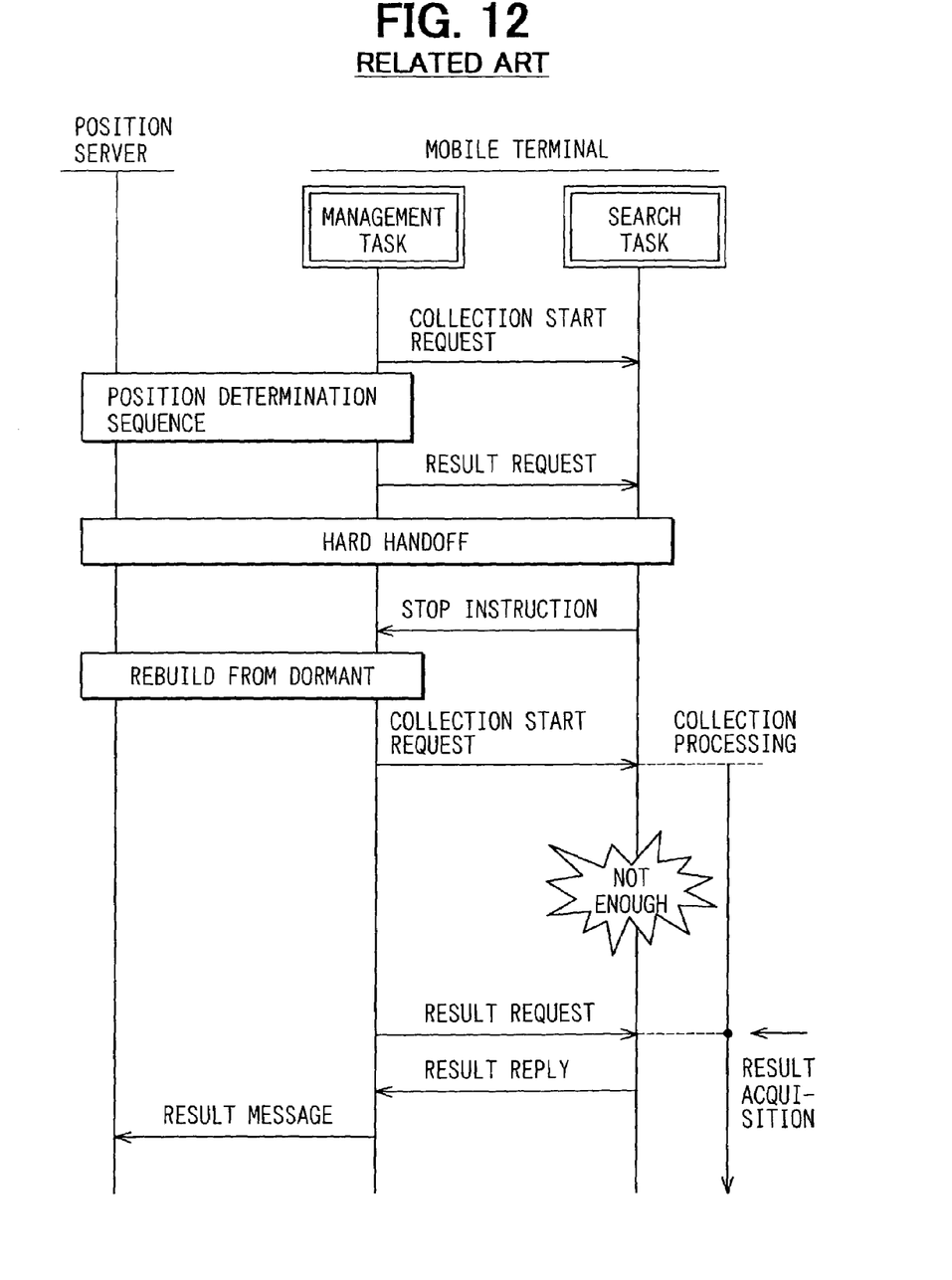
FIG. 12 is a schematic view showing a related art communications sequence when the hard handoff is generated.

Also, as shown in FIG. 12, when a communication between the mobile terminal and the position server rebuilds from a dormant state due to a hard handoff therebetween, the same disadvantage mentioned above may occur. That is, the search task transmits a base station information collection stop instruction to the position determination management task at the hard handoff, and thereafter the position determination management task again transmits the base station information collection result request.

Accordingly, since the term between the base station information collection start request and the base station information collection-result request is too short, it is not enough time to collect the base station information. Therefore, accurate base station information cannot be transmitted to the position server, and the same disadvantage mentioned above occurs.

SUMMARY OF THE INVENTION

It is therefore an object of the present invention to provide a mobile terminal that is capable of obviating the above problems.

It is another object of the present invention to provide a mobile terminal that is capable of accurately determining its position regardless of communication conditions between the mobile terminal and the associated mobile network.

It is another object of the present invention to provide a computer program executed by the mobile terminal and a method for transmitting information that are capable of accurately determining the position of the mobile terminal.

According to a mobile communications terminal of the present invention, a control unit executes base station information collection, acquires base station information collection results, and transmits the base station information collection results to a position server via a radio communications network. A memory stores the base station information collection results. A counter counts a predetermined time. The control unit makes the counter count the predetermined time and makes the memory store the base station information collection result during a time counted by the counter when the base station information collection is started. The control unit then acquires the base station information collection results from the memory after the counter finishes the counting, and transmits the base station information collection results to a position server via the radio communications network.

Therefore, the mobile terminal can obtain accurate base station information and transmit it to the position server. Accordingly, the position server can accurately calculate an approximate position of the mobile terminal and transmit accurate assist information based on the accurate base station information. As a result, the mobile terminal can capture more appropriate GPS signals, and, therefore, the position server can calculate a more accurate position of the mobile terminal based on a resultant signal from the mobile terminal to increase the reliability of the position determination.

According to another aspect of the mobile terminal of the present invention, a determination portion determines whether the base station information collection results satisfy a predetermined requirement. The control unit transmits the base station information collection results to a position server via the radio communications network if the determination portion determines that the base station information collection results satisfy the predetermined requirement.

The predetermined requirement is defined for storing accurate base station information data into the memory. For example, a number of the base station information results or an intensity of a signal including the base station information results is used for the predetermined requirement.

Therefore, it is possible to obtain advantageous effects as mentioned above. That is, the mobile terminal can obtain accurate base station information. The position server can calculate more accurate position of the mobile terminal and increase the reliability of the position determination.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

The present invention will be described further with reference to various embodiments shown in the drawings.

(First Embodiment)

Figure 1:
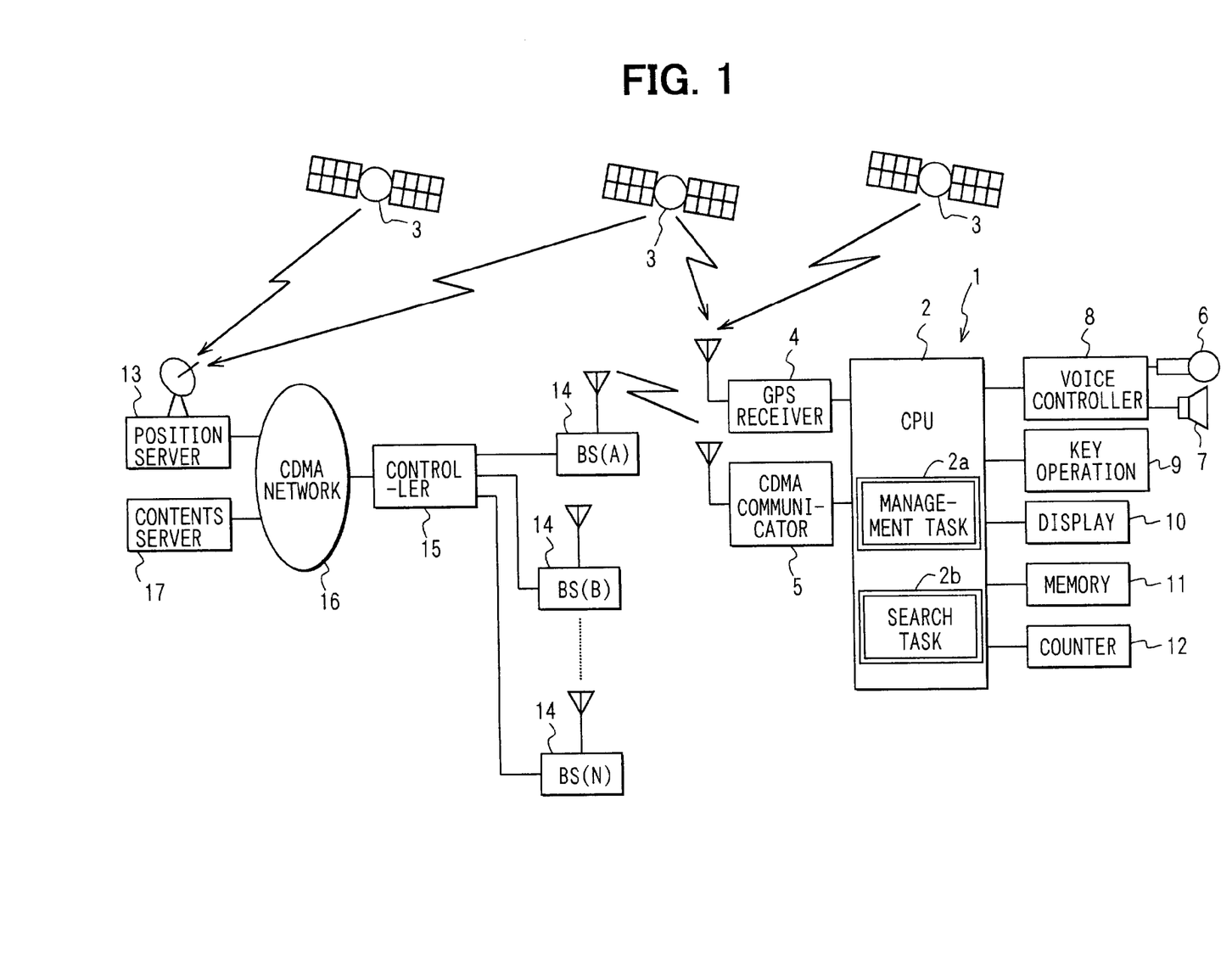
FIG. 1 is a schematic view showing a communications system with a CDMA (Code Division Multiple Access) network according to a first embodiment of the present invention.

Referring to FIG. 1, a mobile terminal 1 includes a CPU (Central Processing Unit) 2 acting as control unit, a GPS signal receiver 4 having a GPS antenna, a CDMA radio communicator (a receiver and a transmitter) 5 having a CDMA antenna, a microphone 6, a speaker 7, a voice controller 8, a key operation portion 9, a display 10, a memory 11 and a counter 12.

The GPS radio receiver 4 is used for receiving GPS signals from GPS satellites 3 through the GPS antenna. The CDMA radio communicator 5 performs radio communication by receiving signals from base stations (BS) 14 and transmitting signals to the base stations 14 through the CDMA antenna. An antenna can be alternatively shared by the GPS antenna and the CDMA antenna. The voice controller 8 controls voice signals received from the microphone 6 and output from the speaker 7. The key operation portion 9 includes key pads in which a communication start key, a communication quit key and digit keys from "0" to "9" are arranged. The key operation portion 9 is operated by the user and transmits signals with respect to the key operation to the CPU 2. The display 10 shows information such as date, time, phone numbers and position information of the mobile terminal 1 to the user. A touch panel type display is alternatively used for the display 10 that also acts as the key operation portion 9. The memory 11, which includes RAM (Random Access Memory) and ROM (Read Only Memory), has stored predetermined programs and data and can store programs and data transmitted form the CPU 2.

The CPU 2 has a position determination management task 2a and a search task 2b as computer algorithms. The position determination management task 2a executes position determination management processing for managing the position determination that is performed with the position server 13. The search task 2b executes base station information collection processing.

According to the mobile terminal 1, for example, when the user operates the key operation portion 9 to request the start of position determination or when a communication between the mobile terminal and the position server rebuilds from a dormant state, the mobile terminal 1 starts base station information collection processing and acquires results thereof. The mobile terminal 1 transmits the base station information collection results to the position server 13 via the base stations 14, a base station controller 15 and a CDMA network 16.

With the received base station information, the position server 13 determines the approximate position of the mobile terminal 1 based on the base station information and transmits assist information to the mobile terminal 1 via the CDMA network 16, the base station controller 15 and the base stations 14. The mobile terminal 1 captures the GPS signals from appropriate GPS satellites 3 based on the received assist information.

A contents server 17 includes contents data for executing application soft ware, for example, game software and map display software and transmitting the contents data to the mobile terminal 1 via the CDMA network 16, the base station controller 15 and the base stations 14. The mobile terminal 1 executes the application software from the contents server 17 and makes the display 10 show, for example, game or map graphics.

Figure 2:
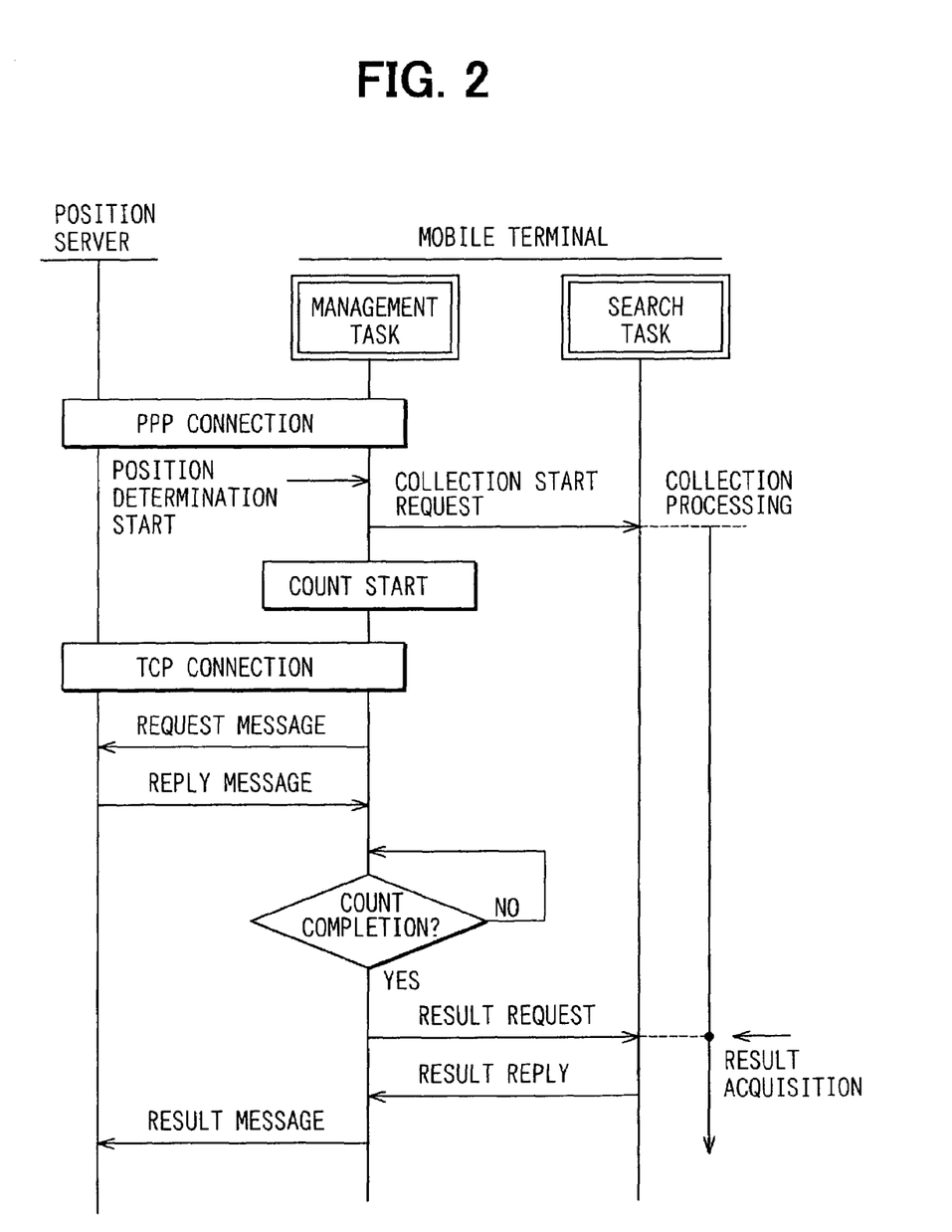
FIG. 2 is a schematic view showing a communications sequence when a PPP connection is performed before a position determination start instruction is transmitted according to the first embodiment.
Figure 3:
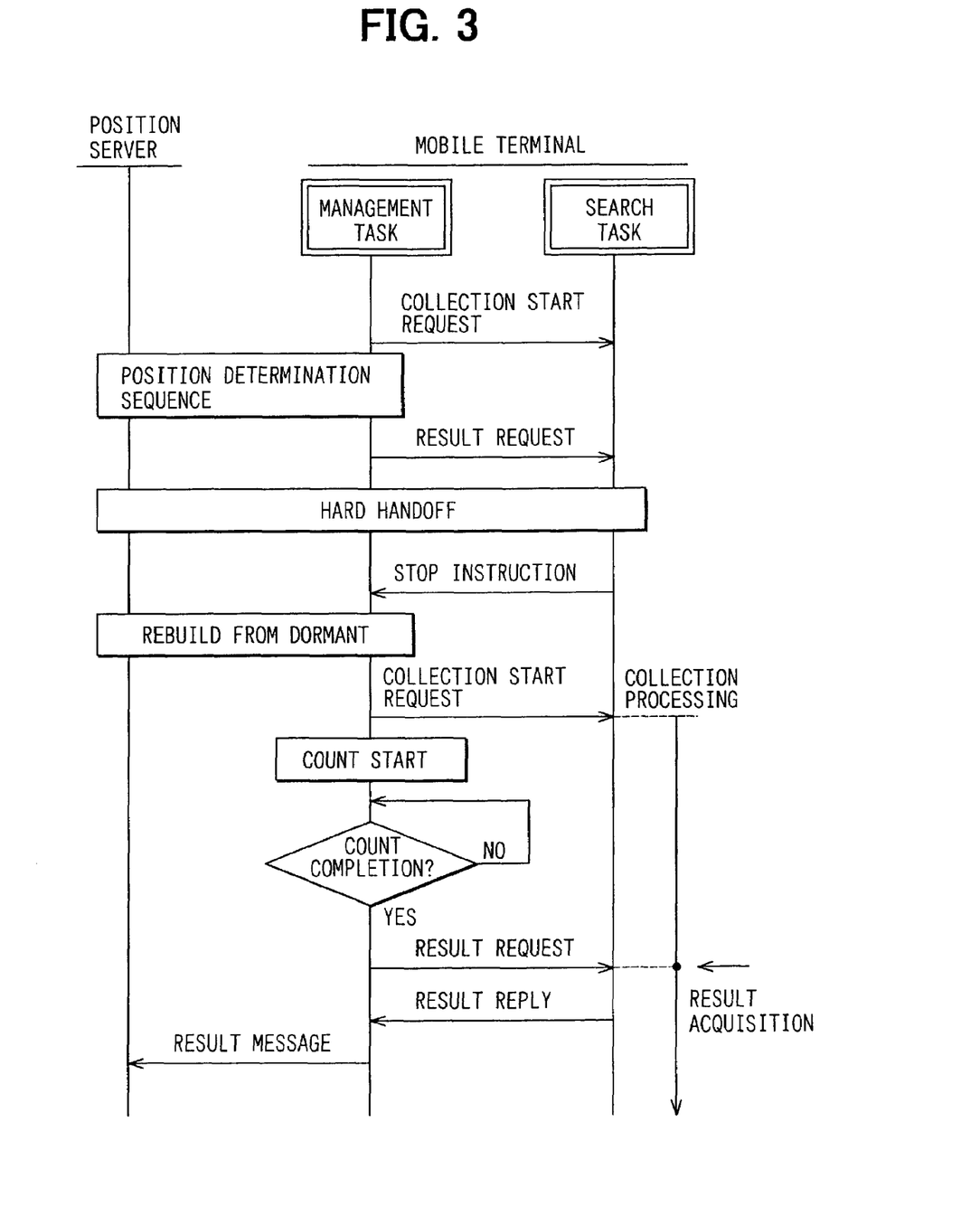
FIG. 3 is a schematic view showing a communications sequence when a hard handoff is generated according to the first embodiment.

According to the first embodiment, the position determination communications between the mobile terminal 1 and the position server 13 is described with reference to FIGS. 2 and 3. Since the mobile terminal 1 starts the base station information collection processing (1) when the user operates the key operation portion 9 to request initiation of the position determination or (2) when a communication between the mobile terminal 1 and the position server 13 rebuilds from a dormant state, both scenarios are described.

(1) When the user operates the key operation portion 9 to request initiation of the position determination, the communication is described with reference to FIG. 2.

In the CPU 2, the position determination management task 2a transmits the base station information collection start request (signal) to the search task 2b after the position determination start request from the user. The position determination management task 2a also determines whether the CDMA radio communicator 5 has already completed a PPP connection. When the CDMA radio communicator 5 has already completed the PPP connection, the position determination management task 2a instructs the counter 12 to count a predetermined time and performs a TCP connection with the position server 13. The predetermined time counted by the counter 12 is defined based on a time for collecting the base station information by the search task 2b and for storing the base station information by the memory 11. The predetermined time can be varied, for example, by the user based on surroundings around the mobile terminal 1 or by an installation style of the base stations 14.

The search task 2b receives the base station information collection start request from the position determination management task 2a and then starts the base station information collection processing. That is, the search task 2b executes a program for collecting the base station information and stores the resultant data in the memory 11.

The position determination management task 2a transmits a position determination start request message (signal) to the position server 13 after the TCP connection with the position server 13 is completed, and determines whether the counter 12 has finished counting the predetermined time. The position determination management task 2a transmits a results request signal to obtain the base station information collection results to the search task 2b if the counter 12 has finished the time count, while waiting to finish the time count by the counter 12 if it has not yet finished.

The search task 2b receives the results request signal and then retrieves the base station information data from the memory 11. The search task 2b inserts the base station information data into a base station information results reply signal and transmits it to the position determination management task 2a.

The position determination management task 2a receives the base station information results reply signal and inserts the base station information data inserted therein into a base station information results message (signal) to the position server 13.

Accordingly, the position server 13 receives the base station information results message, calculates an approximate position of the mobile terminal 1 and determines assist information based on the base station information results data installed in the base station information results message. Further, the position server 13 transmits assist information to the mobile terminal 1. The mobile terminal 1 then captures GPS signals from appropriate GPS satellites 3. Incidentally, a position determination sequence indicates that the same processing shown in FIG. 2 is repeatedly executed.

(2) When a communication between the mobile terminal and the position server rebuilds from a dormant state, the communication is described with reference to FIG. 3.

In the CPU 2, the position determination management task 2a transmits the base station information collection start request (signal) to the search task 2b when the communication between the mobile terminal 1 and the position server 13 rebuilds from the dormant state due to a hard handoff therebetween. The position determination management task 2a also makes the counter 12 count a predetermined time. The time counted by the counter 12 is predetermined and is variable as mentioned above.

The search task 2b receives the base station information collection start request from the position determination management task 2a and then starts the base station information collection processing. That is, the search task 2b executes a program for collecting the base station information and stores the resultant data in the memory 11.

The position determination management task 2a determines whether the counter 12 has finished counting the predetermined time. The position determination management task 2a transmits the results request signal to obtain the base station information collection results from the search task 2b if the counter 12 has finished the time count, while waiting to finish the time count by the counter 12 if it is not yet finished.

The search task 2b receives the results request signal and then pulls up the base station information data from the memory 11. The search task 2b inserts the base station information data into a base station information results reply signal and transmits it to the position determination management task 2a.

The position determination management task 2a receives the base station information results reply signal and inserts the base station information data inserted therein into the base station information results message (signal) to the position server 13.

Accordingly, the position server 13 receives the base station information results message, calculates an approximate position of the mobile terminal 1 and determines assist information based on the base station information results data installed in the base station information results message. Further, the position server 13 transmits assist information to the mobile terminal 1. The mobile terminal 1 then captures GPS signals from appropriate GPS satellites 3.

In the present first embodiment, the mobile terminal 1 executes the base station information collection processing when the user operates the key operation portion 9 to request the position determination start or when a communication between the mobile terminal and the position server rebuilds from the dormant state. The mobile terminal 1 then starts the time count on the predetermined time and obtains the base station information collection results after the time count. Thereafter, the mobile terminal 1 transmits the base station information collection results to the position server 13. Therefore, a term between the base station information collection start request and the base station information collection results request is sufficient to enable accurate base station information to be collected. Also, the mobile terminal 1 can obtain the accurate base station information and transmit it to the position server 13.

Accordingly, the position server 13 can accurately calculate the approximate position of the mobile terminal 1 and transmit accurate assist information based on the accurate base station information. As a result, the mobile terminal 1 can capture more appropriate GPS signals, and, therefore, the position server 13 can calculate a more accurate position of the mobile terminal 1 based on a resultant signal from the mobile terminal 1 to increase the reliability of the position determination.

According to the first embodiment, since the position determination management task 2a manages the predetermined time count, the search task 2b can immediately transmit the base station information results signal to the position determination management task 2a when the position determination management task 2a transmits the base station information results request to the search task 2b. Therefore, a sequence from the base station information results request to the base station information results signal can be used as the same sequence as the related art mentioned above.

(Second Embodiment)

Figure 4:
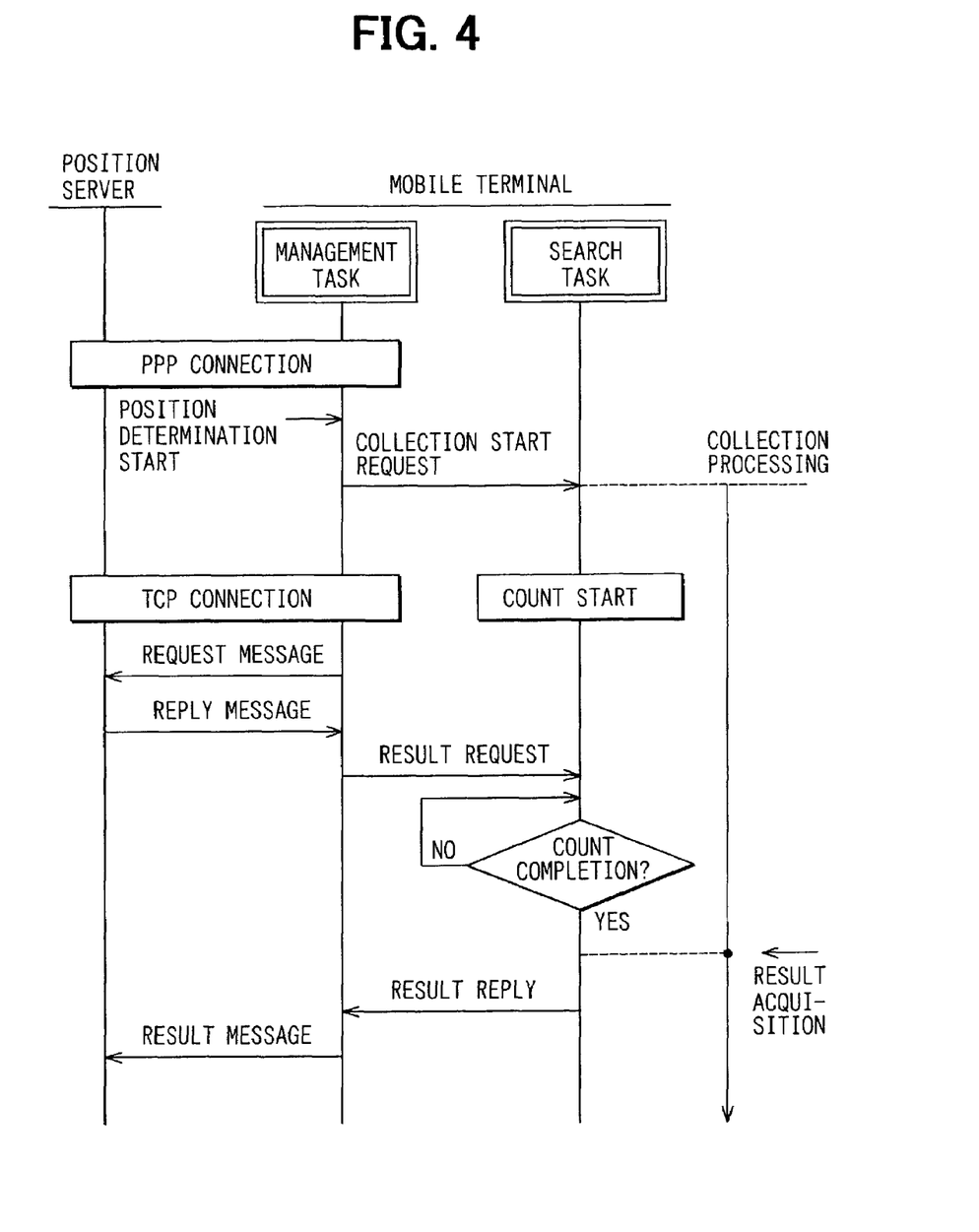
FIG. 4 is a schematic view showing a communications sequence when the PPP connection is performed before a position determination start instruction is transmitted according to a second embodiment.
Figure 5:
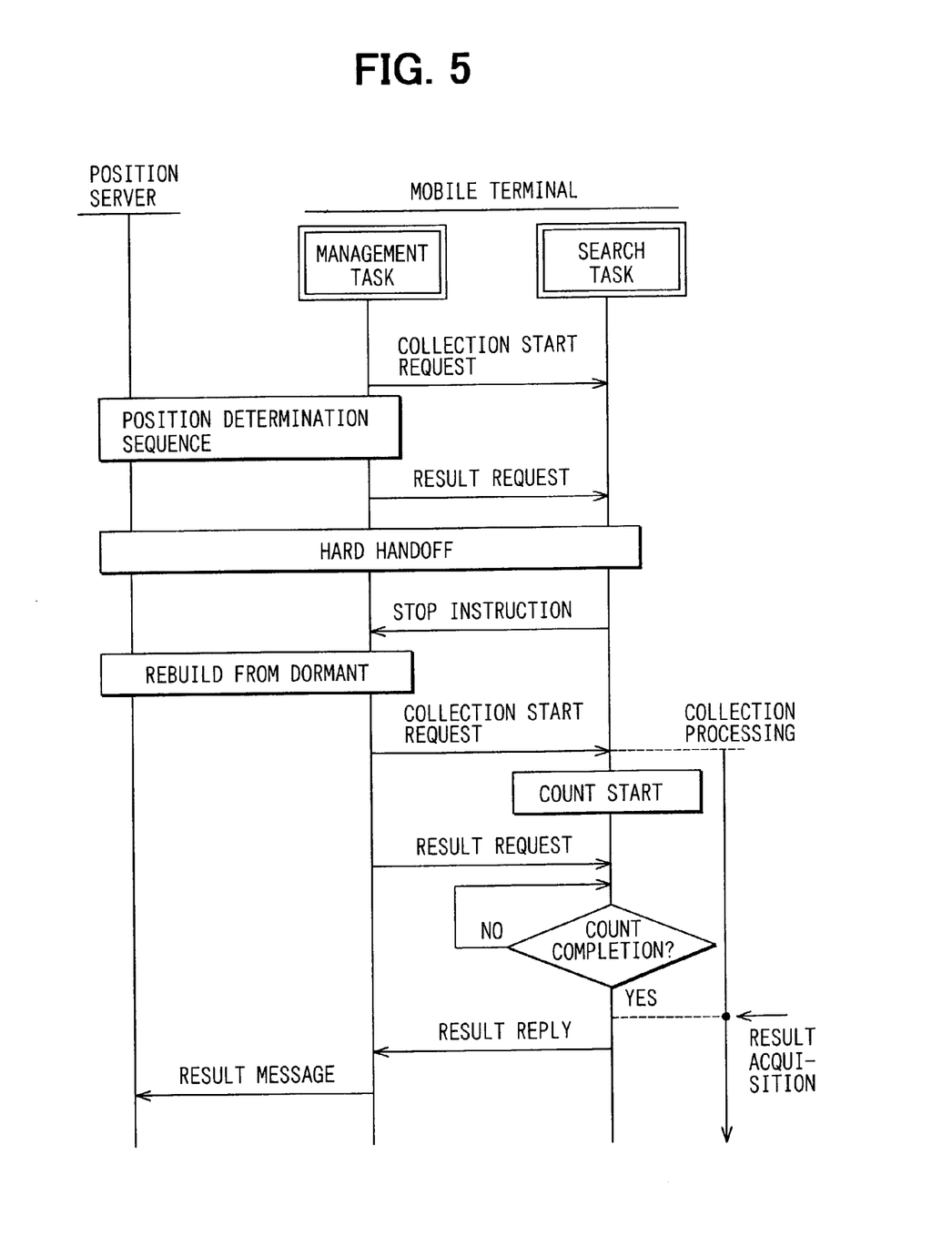
FIG. 5 is a schematic view showing a communications sequence when the hard handoff is generated according to the second embodiment.

In the second embodiment, predetermined time count is executed by a search task 2b. The search task 2b then obtains base station information results from a memory 11, inserts base station information data into a base station information results reply signal and transmits it to a position determination management task 2a.

This is described with reference to FIGS. 4 and 5. Since a mobile terminal 1 starts base station information collection processing (1) when a user operates a key operation portion 9 to request the position determination start or (2) when a communication between the mobile terminal 1 and a position server 13 rebuilds from a dormant state, both scenarios are described.

(1) User operation of the key operation portion 9 to request the position determination start is described with reference to FIG. 4.

In a CPU 2, the position determination management task 2a transmits the base station information collection start request (signal) to the search task 2b after the position determination start request by the user's operation and performs a TCP connection with the position server 13.

The search task 2b receives the base station information collection start request from the position determination management task 2a and starts base station information collection processing. That is, the search task 2b executes a program for collecting the base station information and installs resultant data to the memory 11. The search task 2b also makes the counter 12 count the predetermined time. The predetermined time counted by the counter 12 is defined and is variable as mentioned above.

The position determination management task 2a transmits a position determination start request message (signal) to the position server 13 after the TCP connection with the position server 13 is completed. The position server 13 receives the position determination start request message and transmits a position determination start reply message (signal). The position determination management task 2a receives the reply message and transmits a results request signal to obtain the base station information collection results from the search task 2b.

The search task 2b receives the results request signal and determines whether the counter 12 has finished counting the predetermined time. If the counter 12 has finished the time count, the search task 2b then retrieves the base station information data from the memory 11, inserts it into a base station information results reply signal and transmits it to the position determination management task 2a. On the other hand, if the time count is not yet finished, the search task 2b waits until the time count is finished by the counter 12.

The position determination management task 2a receives the base station information results reply signal and inserts the base station information data inserted therein to a base station information results message (signal) to the position server 13.

(2) A communication between the mobile terminal and the position server rebuilt from a dormant state is described with reference to FIG. 5.

In the CPU 2, the position determination management task 2a transmits the base station information collection start request (signal) to the search task 2b when the communication between the mobile terminal 1 and the position server 13 rebuilds from the dormant state due to a hard handoff therebetween.

The search task 2b receives the base station information collection start request from the position determination management task 2a and then starts the base station information collection processing. That is, the search task 2b executes a program for collecting the base station information and installs resultant data to the memory 11. The search task 2b also makes the counter 12 count a predetermined time. The predetermined time counted by the counter 12 is defined and is variable as mentioned above.

The search task 2b receives the request signal for obtaining the base station information collection results from the position determination management task 2a and determines whether the counter 12 has finished counting the predetermined time. If the counter 12 has finished the time count, the search task 2b then retrieves the base station information data from the memory 11, inserts it to a base station information results reply signal and transmits it to the position determination management task 2a. On the other hand, if the counter has not yet finished the time count, the search task 2b waits for the time count by the counter 12 to finish.

According to the second embodiment, though the search task 2a manages the time count instead of the position determination management task 2a, the other elements are the same as that of the first embodiment. Therefore, it is possible to obtain an advantageous effect as the first embodiment. That is, the mobile terminal 1 can obtain the accurate base station information. As the position server 13 can calculate a more accurate position of the mobile terminal 1, it is possible to increase the reliability of the position determination.

(Third Embodiment)

Figure 6:
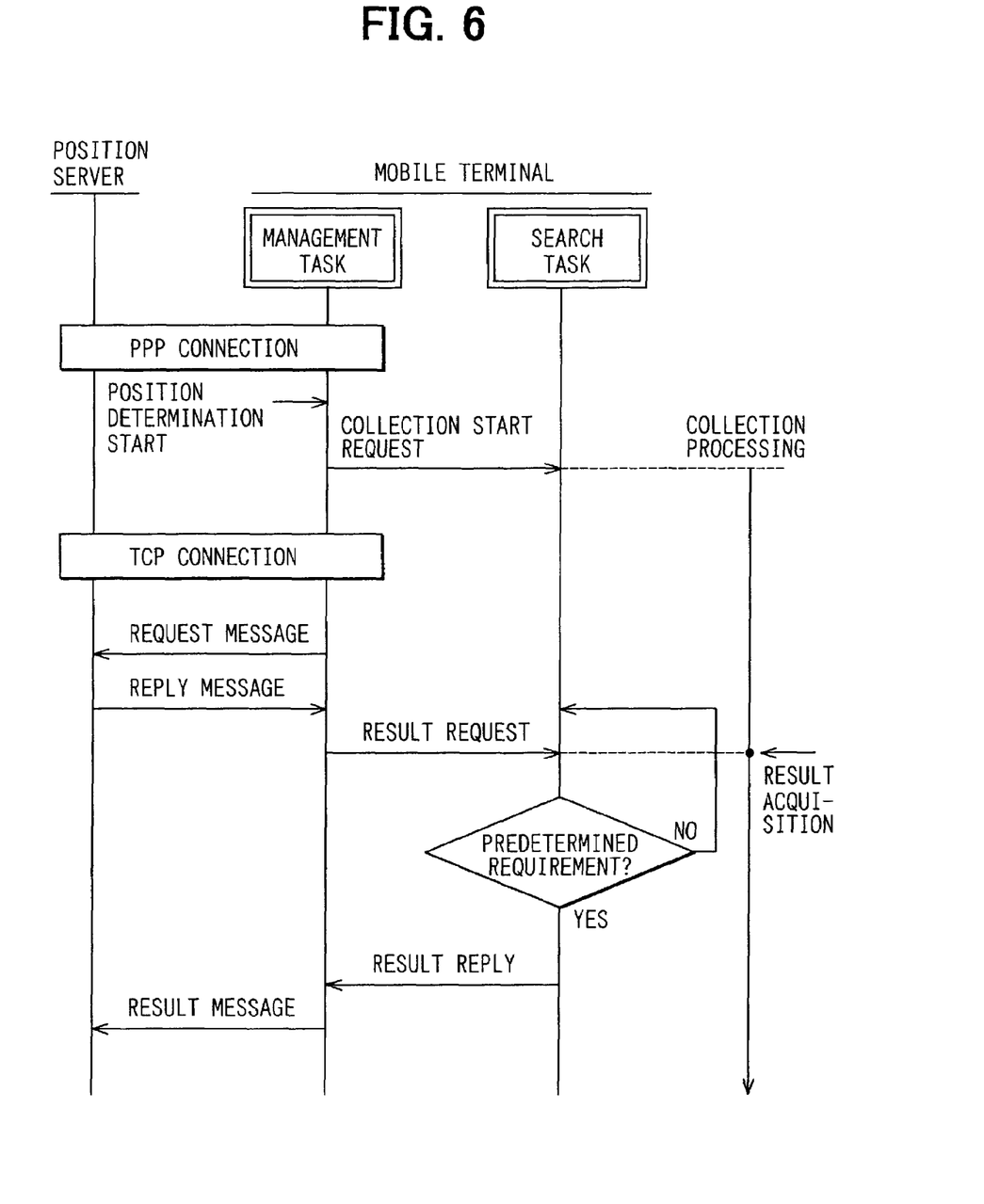
FIG. 6 is a schematic view showing a communications sequence when the PPP connection is performed before a position determination start instruction is transmitted according to a third embodiment.
Figure 7:
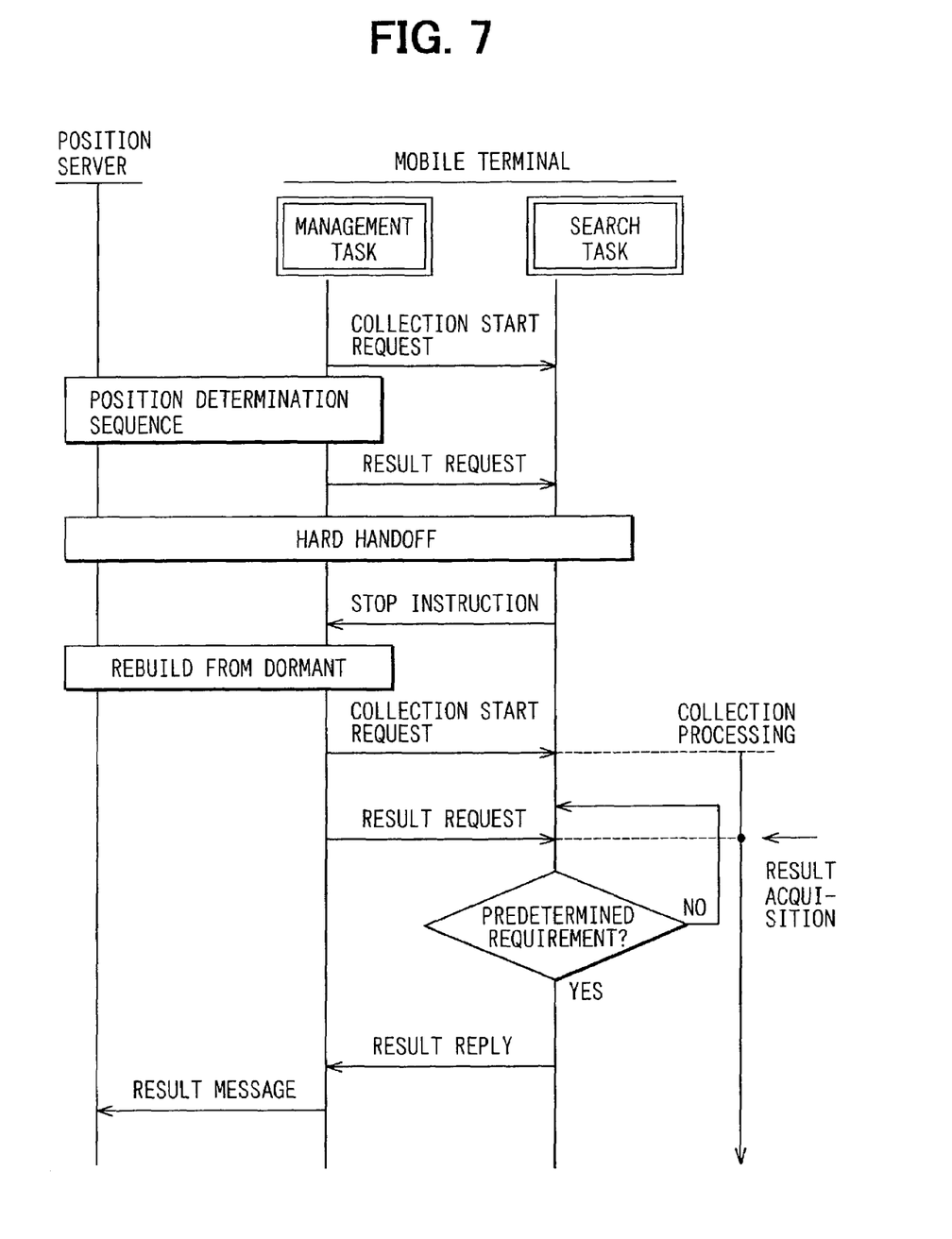
FIG. 7 is a schematic view showing a communications sequence when the hard handoff is generated according to the third embodiment.

In the third embodiment, a search task 2b determines whether base station information results correspond to a predetermined requirement. The search task 2b then transmits the base station information results signal to a position determination management task 2a if the base station information results correspond to a predetermined requirement.

This is described with reference to FIGS. 6 and 7. In the present embodiment, the case when a user operates a key operation portion 9 to request the position determination start and the case when a communication between the mobile terminal 1 and a position server 13 rebuilds from a dormant state are described together.

In both cases, the position determination management task 2a transmits the base station information collection start request (signal) to the search task 2b. The search task 2b receives the base station information collection start request from the position determination management task 2a and obtains base station information results that are stored in a memory 11. The search task 2b also determines whether the base station information results correspond to the predetermined requirement. The predetermined requirement can be defined based on surroundings around the mobile terminal 1, an installation style of the base stations 14 or the like. For example, a number of received transmissions with base station information results or an intensity of a signal including the base station information results is used for the predetermined requirement. In those cases, whether a number of received transmission with base station information results is at least predetermined number or whether the intensity of the signal including the base station information results are at least predetermined value is determined.

The search task 2b repeatedly obtains the base station information results that are stored in a memory 11 until the obtained base station information results satisfy the predetermined requirement. If the base station information results satisfy with the predetermined requirement, the search task 2b inserts the base station information results into a base station information results reply signal and transmits it to the position determination management task 2a.

The position determination management task 2a receives the base station information results reply signal and inserts the base station information data inserted therein into a base station information results message to the position server 13.

According to the third embodiment, the base station information results that satisfy the predetermined requirement mentioned above are transmitted to the position server 13. The predetermined requirement is defined to store accurate base station information data in the memory 11. Therefore, it is possible to obtain an advantageous effect as the first embodiment. That is, the mobile terminal 1 can obtain the accurate base station information. The position server 13 can calculate a more accurate position of the mobile terminal 1. It is possible to increase the reliability of the position determination.

In the third embodiment, if the base station information results satisfy the predetermined requirement, the base station information results are transmitted to the position server without waiting a predetermined time as in the first and second embodiment. That is, in the third embodiment, the predetermined time is not used to determine whether the base station information data is completely restored in the memory 11. Accordingly, the base station information results can be immediately transmitted to the position server 13.

(Fourth Embodiment)

Figure 8:
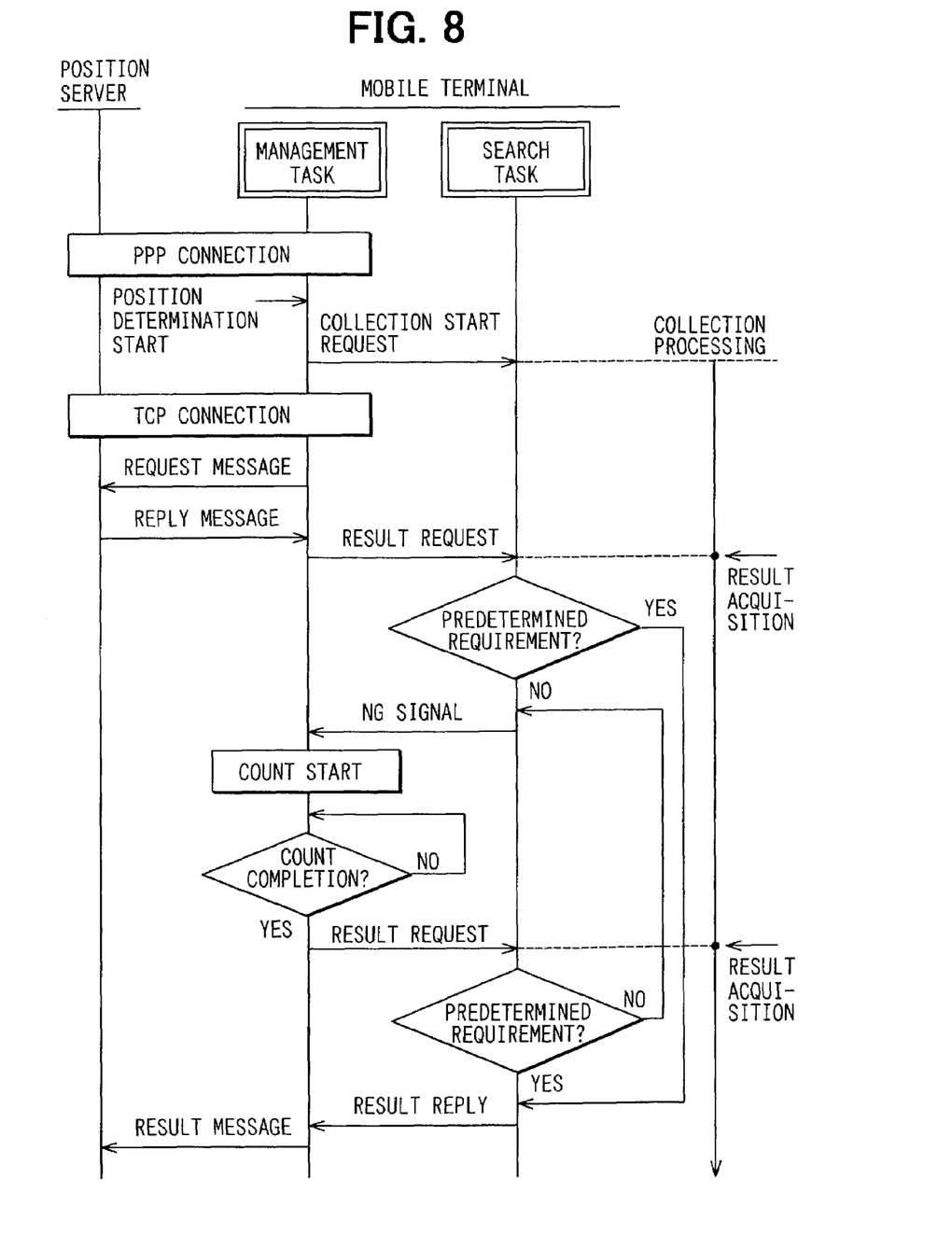
FIG. 8 is a schematic view showing a communications sequence when the PPP connection is performed before a position determination start instruction is transmitted according to a fourth embodiment.
Figure 9:
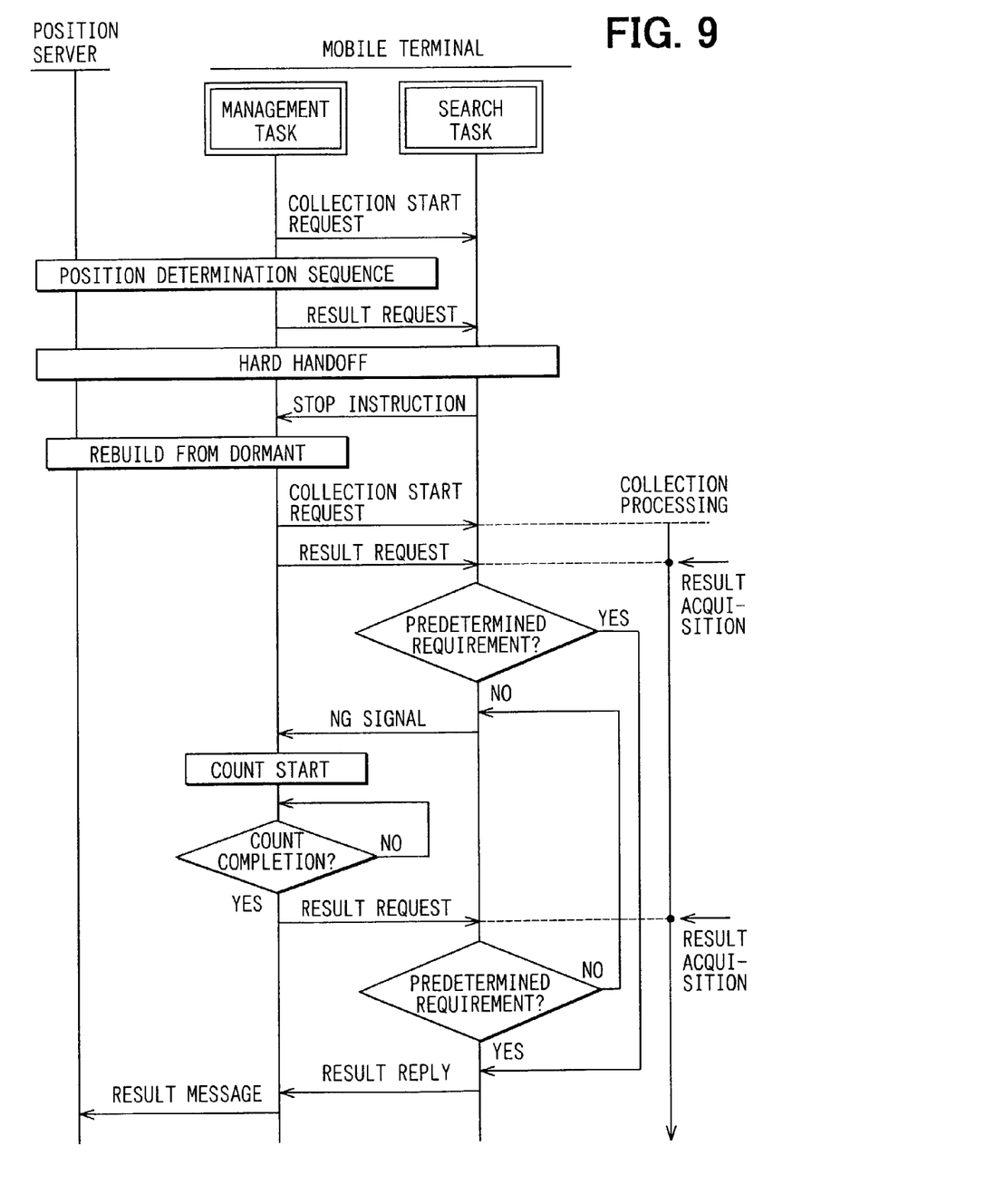
FIG. 9 is a schematic view showing a communications sequence when the hard handoff is generated according to the fourth embodiment.

In the fourth embodiment, a search task 2b determines whether base station information results correspond to a predetermined requirement. A position determination management task 2a instructs a counter 12 to count a predetermined time if the base station information results do not correspond to the predetermined requirement. The position determination management task 2a then transmits a base station information results request to the search task 2a.

Referring to FIGS. 8 and 9, in the present embodiment, cases in which a user operates a key operation portion 9 to request the position determination start and in which a communication between the mobile terminal 1 and a position server 13 rebuilds from a dormant state are described together.

In both cases, the position determination management task 2a transmits the base station information collection start request (signal) to the search task 2b. The search task 2b receives the base station information collection start request from the position determination management task 2a and obtains base station information results that are stored in a memory 11. The search task 2b also determines whether the base station information results correspond to the predetermined requirement. The predetermined requirement can be defined as in the third embodiment. The search task 2b transmits a base station information results NG signal (NG signal) to the position determination management task 2a if the base station information results do not correspond to the predetermined requirement.

The position determination management task 2a receives the NG signal and instructs a counter 12 count the predetermined time. The predetermined time counted by the counter 12 is defined and is variable as mentioned above. The position determination management task 2a transmits the base station information collection request to the search task 2b if the counter 12 has finished the time count, or waits if the time count by the counter 12 is not yet finished.

The search task 2b again obtains the base station information results stored in a memory 11. Further, the search task 2b and the position determination management task 2a repeatedly operate in the same manner mentioned above until the obtained base station information results satisfy the predetermined requirement. If the base station information results satisfied the predetermined requirement, the search task 2b inserts the base station information results into a base station information results reply signal (OK signal) and transmits the results to the position determination management task 2a.

The position determination management task 2a receives the base station information results reply signal and inserts the base station information data therein into a base station information results message to the position server 13.

According to the mobile terminal 1 of the fourth embodiment, it is possible to obtain the advantageous effect as in the first embodiment. The time count is executed only when the base station information results do not correspond to the predetermined requirement. Accordingly, the base station information results can be immediately transmitted if it is accurate.

In the fourth embodiment, the time count is executed when the base station information results do not correspond to the predetermined requirement, and the search task 2b then determines whether the base station information results again correspond to the predetermined requirement. Therefore, the search task 2a has only to obtain the base station information results every predetermined time.

(Modification)

Other communication terminals such as a mobile information terminal can alternatively be adopted as the mobile terminal 1.

The predetermined time or requirement can be defined by other systems with learning functions.

The search task 2b can alternatively obtain and transmit base station information results after the time count is counted regardless of whether the PPP connection between the mobile terminal 1 and the position server 13 is completed. The search task 2b can alternatively determine whether the base station information results correspond to the predetermined requirement and the position determination management task 2a can transmit the base station information to the position server 13 regardless of whether the PPP connection between the mobile terminal 1 and the position server 13 is completed.

A computer program executed by the CPU 2 can be stored not only during the manufacturing process but also by downloading via a network or by installing it from a recording medium (e.g., a CD-ROM (Compact Disk-Read Only Memory) or a memory card).

While the above description is of the preferred embodiments of the present invention, it should be appreciated that the invention may be modified, altered, or varied without deviating from the scope and fair meaning of the following claims.

What is claimed is:

1. A mobile communications terminal for a communications system including at least one base station, GPS satellites and a radio communications network, the terminal comprising:
    a control unit for executing base station information collection, acquiring base station information collection results, and transmitting the base station information collection results to a position server via a radio communications network;
    a memory for storing the base station information collection results; and
    a counter, operably connected to the control unit, for counting a predetermined time,
    wherein the memory stores results of the base station information collection during the predetermined time when the base station information collection is initiated by a user of the mobile terminal, the base station information collection results are retrieved from the memory after the counter finishes the counting of the predetermined time, and the base station information collection results are transmitted to the position server via the radio communications network, so that a position of the mobile terminal is calculated by the position server.

2. A mobile communications terminal according to claim 1, wherein the control unit executes the base station information collection after a Point to Point Protocol connection between the mobile communications terminal and the position server is completed and before a Transmission Control Protocol connection between the mobile communications terminal and the position server is completed, and the base station information collection results are transmitted while the Point to Point Protocol and the Transmission Control Protocol are connected.

3. A mobile communications terminal according to claim 1, further comprising:
    a transceiver for transmitting to and receiving a signal from the radio communications network;
    wherein the transceiver transmits the base station information results to the position server and receives an assist signal in accordance with a calculated mobile terminal position from the position server, and
    the mobile communications terminal captures GPS signals from GPS satellites based on the assist signal.

4. A mobile communications terminal according to claim 1, wherein the transceiver transmits signal including received GPS signals data to the position server and receives position information that is calculated by the position server based on the received GPS signals.

5. A computer processor for executing a program for transmitting base station information from a mobile communications terminal to a position server, the computer processor being operative for:
    starting base station information collection by the mobile communications terminal;
    counting a predetermined time by a counter after the base station information collection is started by a user of the mobile communications terminal;
    collecting base station information until the counting is completed;
    storing base station information collection results in a memory;
    acquiring the base station information collection results from the memory after the counter counts the predetermined time; and
    transmitting the base station information results from the mobile communications terminal to the position server via a radio communications network,
    wherein a position of the mobile terminal is calculated by the position server.

6. A base station information transmission method comprising:
    initiating base station information collection by a user of a mobile communications terminal;
    counting a predetermined time by a counter after the base station information collection is started;
    acquiring the base station information collection results from the memory after the counter counts the predetermined time; and
    collecting base station information until the counting is completed;
    storing base station information collection results in a memory;
    transmitting the base station information results from the mobile communications terminal to the position server via a radio communications network, wherein a position of the mobile terminal is calculated by the position server.

7. A computer processor according to claim 5, being further operative for executing the base station information collection after a Point to Point Protocol connection between the mobile communications terminal and the position server is completed and before a Transmission Control Protocol connection between the mobile communications terminal and the position server is completed, and for transmitting the base station information collection results while the Point to Point Protocol and the Transmission Control Protocol are connected.

8. A computer processor according to claim 5, being further operative for:
    transmitting the base station information results to the position server via the radio communications network and receiving an assist signal in accordance with a calculated mobile terminal position from the position server via the radio communications network; and
    capturing GPS signals from GPS satellites based on the assist signal.

9. A computer processor according to claim 5, being further operative for transmitting a signal including received GPS signals data to the position server and receiving position information that is calculated by the position server based on the received GPS signals.

10. A base station information transmission method according to claim 6, further comprising:
    executing the base station information collection after a Point to Point Protocol connection between the mobile communications terminal and the position server is completed and before a Transmission Control Protocol connection between the mobile communications terminal and the position server is completed; and
    transmitting the base station information collection results while the Point to Point Protocol and the Transmission Control Protocol are connected.

11. A base station information transmission method according to claim 6, further comprising:

transmitting to and receiving a signal from the radio communications network, wherein the base station information results are transmitted to the position server and an assist signal in accordance with a calculated mobile terminal position is received from the position server; and capturing GPS signals from GPS satellites based on the assist signal.

12. A base station information transmission according to claim 6, further comprising transmitting a signal including received GPS signals data to the position server and receiving position information that is calculated by the position server based on the received GPS signals.

* * * * *